US007385002B2

(12) United States Patent
Shirai et al.

(10) Patent No.: US 7,385,002 B2
(45) Date of Patent: Jun. 10, 2008

(54) PROCESS FOR PREPARING RESIN BINDER FOR TONER

(75) Inventors: Eiji Shirai, Wakayama (JP); Tetsuya Ueno, Wakayama (JP)

(73) Assignee: Kao Corporation, Tokyo (JP)

( * ) Notice: Subject to any disclaimer, the term of this patent is extended or adjusted under 35 U.S.C. 154(b) by 407 days.

(21) Appl. No.: 11/139,556

(22) Filed: May 31, 2005

(65) Prior Publication Data

US 2005/0271963 A1 Dec. 8, 2005

(30) Foreign Application Priority Data

Jun. 8, 2004 (JP) ............................ 2004-170139

(51) Int. Cl.
*C08G 63/20* (2006.01)
*C08F 212/08* (2006.01)
*G03G 9/00* (2006.01)

(52) U.S. Cl. ...................... 524/846; 524/611; 524/763; 525/168; 526/329.2; 526/347; 528/499; 430/109.3; 430/109.4; 430/907; 430/908

(58) Field of Classification Search ............ 430/109.3, 430/907, 109.4, 908; 528/499; 526/329.2, 526/347; 525/168; 524/846, 611, 763
See application file for complete search history.

(56) References Cited

U.S. PATENT DOCUMENTS 4,971,879 A 11/1990 Kimura et al.
5,217,836 A * 6/1993 Takiguchi et al. ....... 430/109.3
5,476,745 A * 12/1995 Nakamura et al. ..... 430/137.17
5,483,016 A * 1/1996 Aoki et al. ............ 526/318.45
6,288,166 B1 * 9/2001 Sata et al. .................... 525/69
6,495,648 B1 * 12/2002 Inagaki et al. ............. 526/347

OTHER PUBLICATIONS

Patent Abstracts of Japan, JP 7-120971, May 12, 1995 (with patent family).
Patent Abstracts of Japan, JP 07-049588, Feb. 21, 1995.
Patent Abstracts of Japan, JP 08-328311, Dec. 13, 1996 (with patent family and corr. US 4,971,879).
Patent Abstracts of Japan, JP 61-176603, Aug. 8, 1986 (with patent family).
Patent Abstracts of Japan, JP 2000-298374, Oct. 24, 2000.

* cited by examiner

*Primary Examiner*—Fred Teskin
(74) *Attorney, Agent, or Firm*—Oblon, Spivak, McClelland, Maier & Neustadt, P.C.

(57) ABSTRACT

The present invention relates to a process for preparing a resin binder for toner, comprising the steps of (A) carrying out an addition polymerization reaction of addition polymerization resin monomers including styrene in the presence or absence of an organic solvent; and (B) mixing the resulting reaction mixture from the step (A) with water at a rate of 0.002 to 0.5 parts by weight based on 100 parts by weight of the addition polymerization resin monomers per minute at a temperature of 100° to 300° C. during and/or after the step (A), wherein the amount of water to be mixed in the step (B) is 0.1 to 50 parts by weight based on 100 parts by weight of the addition polymerization resin monomers. The resin binder for a toner obtained according to the present invention can be used, for instance, for developing electrostatic latent images formed in electrophotography, electrostatic recording method, electrostatic printing method, and the like, and a toner containing the resin binder.

14 Claims, No Drawings

PROCESS FOR PREPARING RESIN BINDER FOR TONER

FIELD OF THE INVENTION

The present invention relates to a resin binder for a toner used, for example, for developing electrostatic latent images formed in electrophotography, electrostatic recording method, electrostatic printing method, and the like, and a process for preparing the resin binder.

BACKGROUND OF THE INVENTION

Requests for safety in resin binders for toner have been stronger in recent years. In addition, an odor emitted when the resin binders are exposed to an environment at high temperature during the melt-kneading in toner manufacturing or during fusing and fixing in using tones is a problem to be solved. In view of this, therefore, various methods have been studied for reducing the amount of monomers remaining in the resin binder.

For example, there is a method in which polymerization initiators having different half lives are used (JP-A-Hei-7-120971 and JP-A-Hei-7-49588). In these methods, however, the effect of reducing the styrene content is insufficient, and increase in the reaction time, variation in the molecular weight distribution of the resin, difficulty in adjusting various physical properties, and the like are caused. Moreover, odor due to remnants of the initiator is a matter to be concerned.

Also, there has been proposed a method for reducing the amount of remaining monomers by distilling water in the reaction system off as water vapor after polymerizing monomers in a suspension polymerization system (JP-A-Hei-8-328311).

A method in which an alkali metal hydroxide is added (alkaline treatment) has been also proposed (JP-A-Showa-61-176603). However, since care must be taken to avoid hydrolysis, as noted therein, this method cannot be used in a wide variety of applications. In cases that hydrolysis is not caused, the alkali metal hydroxide is to remain in the resin, so that influence on the physical properties of the toner is a matter to be concerned.

Further, there has been proposed a method of improving manufacturing facilities for toners (JP2000-298374 A). In this method, the effect of reducing the styrene content is insufficient, and introduction of additional equipment is required.

SUMMARY OF THE INVENTION

The present invention relates to:

[1] a process for preparing a resin binder for toner, comprising the steps of:
- (A) carrying out an addition polymerization reaction of addition polymerization resin monomers including styrene in the presence or absence of an organic solvent; and
- (B) mixing the resulting reaction mixture from the step (A) with water at a rate of 0.002 to 0.5 parts by weight based on 100 parts by weight of the addition polymerization resin monomers per minute at a temperature of 100° to 300° C. during and/or after the step (A), wherein the amount of water to be mixed in the step (B) is 0.1 to 50 parts by weight based on 100 parts by weight of the addition polymerization resin monomers;

[2] a process for preparing a resin binder for toner, comprising the steps of:
- (A) carrying out an addition polymerization reaction of addition polymerization resin monomers including styrene in the presence or absence of an organic solvent;
- (B) mixing the resulting reaction mixture from the step (A) with water at a temperature of 100° to 300° C. during and/or after the step (A); and
- (C) introducing condensation polymerization resin monomers into the reaction system in the step (A) at least one timing selected from before, during and after the step (A), to carry out a condensation polymerization reaction, wherein the amount of water to be mixed in the step (B) is 0.1 to 50 parts by weight based on 100 parts by weight of the addition polymerization resin monomers; and

[3] a resin binder for toner obtained by the process of [1] or [2] above, wherein the styrene content is 60 ppm or less, and the content of the ester of an ethylenic monocarboxylic acid is 150 ppm or less.

DETAILED DESCRIPTION OF THE INVENTION

The present invention relates to a process for preparing a resin binder for toner having an efficiently reduced amount of monomers remaining in the resin, which are ascribed to safety problem and odor problem, with substantially no influence on the physical properties and characteristics of the resin; and a resin binder for toner having a reduced amount of remaining monomers, which is obtainable by the method.

According the present invention, there can be provided a process for preparing a resin binder for toner, by which method the amount of monomers remaining in the resin, which are ascribed to odor problem and safety problem, can be efficiently reduced, with substantially no influence on the physical properties and characteristics of the resin.

These and other objects of the present invention will be apparent from the following description.

The present inventors intensively studied on the methods for efficiently reducing the amount of monomers remaining in the resin, which are ascribed to odor problem and safety problem, with substantially no influence on the physical properties and characteristics of the resin. Usually, a compound used as an addition polymerization resin monomer can be relatively easily removed to a certain level by heating the reaction system or reducing the pressure thereof. However, it was difficult to remove such compound to an extent that there in no problem at all with odor, with substantially no influence on the physical properties and characteristics of the resin. Therefore, the present inventors studied on the methods for efficiently reducing the amount of monomers remaining in the resin in view of such compounds. As a result, the present inventors have found that low-boiling point substances such as styrene and esters of an ethylenic monocarboxylic acid in the resin, which are ascribed to odor problem, can be removed without adding an additional component, by utilizing an azeotropic effect with water when a resin binder is prepared.

Next, the process for preparing the resin binder for toner of the present invention will be described in more detail.

The resin binder for toner of the present invention can be prepared via at least the steps (A) and (B) as described below.

The step (A) is a step of carrying out an addition polymerization reaction of addition polymerization resin monomers mers including styrene. Styrene comprises preferably 30 to 95% by weight, and more preferably 60 to 90% by weight of the addition polymerization resin monomers, from the viewpoint of storage property of the toner.

The addition polymerization resin monomers other than styrene includes vinyl resin monomers, for example, styrenic derivatives such as α-methylstyrene; ethylenically unsaturated monoolefins such as ethylene and propylene; diolefins such as butadiene; vinyl halides such as vinyl chloride; vinyl esters such as vinyl acetate and vinyl propionate; esters of ethylenic monocarboxylic acids such as alkyl(1 to 18 carbon atoms) esters of (meth)acrylic acid and dimethylaminoethyl (meth)acrylate; vinyl ethers such as vinyl methyl ether; vinylidene halides such as vinylidene chloride; N-vinyl compounds such as N-vinylpyrrolidone; and the like. Among them, esters of ethylenic monocarboxylic acids copolymerizable with styrene are preferable, and alkyl(1 to 18 carbon atoms) esters of (meth)acrylic acid are more preferable, from the viewpoint of easily controlling the polymerization reaction and the viewpoint of safety.

The ester of an ethylenic monocarboxylic acid comprises preferably 5 to 70% by weight, and more preferably 10 to 40% by weight, of the addition polymerization resin monomers.

Further, the stylene and the ester of an ethylenic monocarboxylic acid together comprise preferably 70% by weight or more, more preferably 80% by weight or more, and even more preferably 90% by weight or more, of the addition polymerization resin monomers.

The addition polymerization reaction in the step (A) can be carried out, for example, in the presence of a polymerization initiator, a cross-linking agent and the like, in the presence or absence of an organic solvent, by a conventional method. The temperature conditions are preferably at 110° to 200° C., and more preferably at 140° to 170° C.

The organic solvent used in the addition polymerization reaction includes xylene, toluene, methyl ethyl ketone, acetone and the like. It is preferable that the amount of the organic solvent used is approximately 10 to 50 parts by weight based on 100 parts by weight of the addition polymerization resin monomers.

The addition polymerization reaction in the step (A) may be carried out in the presence of a wax.

The wax includes aliphatic hydrocarbon-based waxes such as low-molecular weight polypropylene, low-molecular weight polyethylene, low-molecular weight polypropylene-polyethylene copolymer, microcrystalline wax, paraffin wax and Fischer-Tropsch wax, and oxidized waxes thereof; ester waxes such as carnauba wax, montan wax and Sazole wax, and deoxidized waxes thereof; fatty acid amides; fatty acids; higher alcohols; fatty acid metal salts; and the like. Among them, aliphatic hydrocarbon-based waxes are preferable from the viewpoint of releasing property and stability.

The amount of the wax added is preferably 20 parts by weight or less, and more preferably 10 parts by weight or less, based on 100 parts by weight of the entire resin monomers used for preparing the resin binder.

The timing for adding the wax is not particularly limited. The wax may be added at an early stage of polymerization reaction or during the polymerization reaction.

The step (B) is a step of mixing the resulting reaction mixture from the step (A) with water during and/or after the step (A).

The rate at which the resulting reaction mixture from the step (A) is mixed with water is 0.002 to 0.5 parts by weight, preferably 0.01 to 0.3 parts by weight, and more preferably 0.03 to 0.2 parts by weight, based on 100 parts by weight of the addition polymerization resin monomers per minute.

The amount of water to be mixed is 0.1 to 50 parts by weight, preferably 0.5 to 40 parts by weight, and more preferably 1 to 30 parts by weight, based on 100 parts by weight of the addition polymerization resin monomers, from the viewpoint of controlling the influence on the physical properties of the resin.

The temperature at which the resulting reaction mixture from the step (A) is mixed with water is 100° to 300° C., preferably 130° to 250° C., and more preferably 150° to 240° C., from the viewpoint of evaporation efficiency of water and viscosity of the reaction mixture.

The method for mixing the resulting reaction mixture from the step (A) with water is not particularly limited. The method specifically includes, for example, a method of adding water dropwise to the reaction mixture and a method of contacting water with the reaction mixture, with the former method being preferable in the present invention. In a method of bubbling by air blowing or the like, as in the conventional methods, since the viscosity of the resin is high, each bubble becomes larger, and there is no interaction between the bubbles and the resin, so that sufficient effects cannot be obtained. By contrast, in the present invention, water added dropwise or water upon contact with the reaction mixture turns into fine bubbles of vapor in the reaction mixture and uniformly and widely diffuses through the resin. Moreover, low-boiling point substances ascribed to odor can be efficiently removed by the azeotropic effect with water. Though the water to be mixed will evaporate after being added dropwise, the water content in the resin is preferably 0.2% by weight or less from the viewpoint of triboelectric chargeability of toner. The method for reducing the water content is preferably a method of retaining the reaction mixture at a temperature of 100° C. or higher after completion of adding water dropwise, a method of removing water under reduced pressure, and the like.

In the present invention, the step (B) may be carried out during and/or after the step (A). Specifically, it is not necessary to carry out the step (A) and the step (B) separately, and both steps may be carried out partially concurrently. Therefore, the timing for mixing the reaction mixture with water may be after the addition polymerization reaction, or during the addition polymerization reaction in the step (A). In the present invention, from the viewpoint of mixing performance between water and the resin, the weight-average molecular weight of the resulting addition polymerization resin from the step (A) of mixing with water is preferably from 2000 to 100000, and it is preferable that water is added after the completion of the addition polymerization reaction in the step (A). The degree of progress of the addition polymerization reaction can be estimated or confirmed on the basis of the half life of the initiator employed or the amount of heat of reaction.

Further, the resin binder for toner obtained according to the present invention is not limited to those consisting of an addition polymerization resin alone. In particular, a hybrid resin containing a condensation polymerization resin component and an addition polymerization resin component is a more preferable embodiment of the resin binders obtained according to the present invention because it is easy to control the viscosity of the resin for the purpose of more efficiently removing the remaining monomers.

In the present invention, the hybrid resin is preferably a resin in which a condensation polymerization resin component and an addition polymerization resin component are partially chemically bonded to each other. The hybrid resin is obtained by a method including, in addition to the step (A) and the step (B), the step (C) for introducing condensation polymerization resin monomers into the reaction system of the previous step at least one timing selected from before, during and after the step (A) and the step (B), to carry out a condensation polymerization reaction.

The condensation polymerization resin component in the hybrid resin includes polyesters, polyamides, polyester-polyamides, and the like. Polyesters are preferable from the viewpoint of easy bonding with a reaction product of water and styrene.

As the raw material monomers for the polyester, a known dihydric or higher polyhydric alcohol component, and a known carboxylic acid component such as dicarboxylic or higher polycarboxylic acid compounds, acid anhydrides thereof and alkyl esters thereof.

The alcohol component preferably contains a compound represented by the formula (I):

(I)

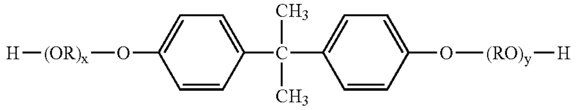

wherein R is an alkylene group having 2 or 3 carbon atoms; x and y are a positive number; and the sum of x and y is from 1 to 16, preferably from 1.5 to 5.0.

The compound represented by the formula (I) includes an alkylene (2 or 3 carbon atoms) oxide (average number of moles: 1 to 16) adduct of bisphenol A, such as polyoxypropylene(2.2)-2,2-bis(4-hydroxyphenyl)propane and polyoxyethylene(2.0)-2,2-bis(4-hydroxyphenyl)propane. In addition, other alcohol components include ethylene glycol, propylene glycol, glycerol, pentaerythritol, trimethylolpropane, hydrogenated bisphenol A, sorbitol and alkylene (2 to 4 carbon atoms) oxide (average number of moles: 1 to 16) adducts thereof, and the like.

It is desired that the compound represented by the formula (I) contained in the alcohol component is 5% by mol or more, preferably 50% by mol or more, and more preferably 100% by mol.

Also, the carboxylic acid component includes aromatic dicarboxylic acids such as phthalic acid, isophthalic acid and terephthalic acid; aliphatic dicarboxylic acids such as fumaric acid and maleic acid; a substituted succinic acid of which substituent is an alkyl group having 1 to 20 carbon atoms or an alkenyl group having 2 to 20, such as dodecenylsuccinic acid and octylsuccinic acid; trimellitic acid and pyromellitic acid; anhydrides thereof; alkyl(1 to 3 carbon atoms) esters thereof; and the like. Among them, aromatic dicarboxylic acids, anhydrides thereof and alkyl(1 to 3 carbon atoms) esters thereof are preferable.

Further, the alcohol component and the carboxylic acid component may appropriately include a monohydric alcohol and a monocarboxylic acid compound, respectively, from the viewpoints of adjustment of molecular weight and the like.

The condensation polymerization reaction of the alcohol component and the carboxylic acid component can be carried out, for example, in an inert gas atmosphere at a temperature of 180° to 250° C., using an esterification catalyst as desired.

The weight ratio of the condensation polymerization resin monomer to the addition polymerization resin monomer (condensation polymerization resin monomer/addition polymerization resin monomer) used for preparing the hybrid resin is preferably from 55/45 to 95/5, more preferably from 60/40 to 95/5, and even more preferably from 70/30 to 90/10, from the viewpoint of forming the continuous phase by the condensation polymerization resin.

In the present invention, it is preferable that the hybrid resin has as a constituent unit a monomer capable of reacting with both of a condensation polymerization resin monomer and an addition polymerization resin monomer (hereinafter referred to as dually reactive monomer). Therefore, in the present invention, it is preferable that the condensation polymerization reaction and the addition polymerization reaction are carried out in the presence of the dually reactive monomer, and thus the condensation polymerization resin components and the addition polymerization resin components are partially bonded via the dually reactive monomers, so that a resin in which the addition polymerization resin components are more finely and uniformly dispersed in the condensation polymerization resin components can be obtained.

It is preferable that the dually reactive monomer is a monomer having in its molecule at least one functional group selected from the group consisting of hydroxyl group, carboxyl group, epoxy group, a primary amino group and a secondary amino group, preferably a hydroxyl group and/or a carboxyl group, and more preferably a carboxyl group, and an ethylenically unsaturated bond. Concrete examples of the dually reactive monomer include, for example, acrylic acid, methacrylic acid, fumaric acid, maleic acid, and the like. Further, the dually reactive monomer may be hydroxyalkyl(1 to 3 carbon atoms) esters of these acids, and acrylic acid, methacrylic acid and fumaric acid are preferable from the viewpoint of reactivity.

In the present invention, among the dually reactive monomers, monomers having two or more functional groups (such as polycarboxylic acid), and derivatives thereof, are considered to be a condensation polymerization resin monomer, while monomers having one functional group (such as monocarboxylic acid), and derivatives thereof, are considered to be an addition polymerization resin monomer. The amount of the dually reactive monomer used is preferably from 1 to 10% by mol, and more preferably from 4 to 8% by mol, of the condensation polymerization resin monomer in the case of the monomers having two or more functional groups and derivatives thereof, or of the addition polymerization resin monomer in the case of the monomers having one functional group and derivatives thereof.

In the present invention, when the hybrid resin is prepared, it is preferable that the condensation polymerization reaction and the addition polymerization reaction are carried out in the same reactor. In addition, these polymerization reactions do not necessarily progress or terminate simultaneously, and each of the reactions may be progressed or terminated by appropriately selecting the reaction temperature and reaction time depending on the reaction mechanism.

The order of the steps (A) and (C) in the process for preparing the hybrid resin include:

i) carrying out the step (A) after the step (C) of carrying out a condensation polymerization;

ii) starting the step (C) of carrying out a condensation polymerization before the step (A); and after the step (A), raising the reaction temperature again and adding trivalent or higher multivalent condensation polymerization resin monomers, which act as a cross-linking agent, as required, to allow the step (C) of condensation polymerization reaction to further proceed;

iii) carrying out concurrently the step (A) of carrying out an addition polymerization reaction and the step (C) of carrying out a condensation polymerization reaction under temperature conditions suitable for the addition polymerization reaction; keeping the reaction temperature to the above-mentioned conditions to complete the step (A); and thereafter raising the reaction temperature and adding trivalent or higher multivalent condensation polymerization resin monomers, which act as a cross-linking agent, as required, to allow the step (C) of condensation polymerization reaction to further proceed; and the like.

In these methods, the step (B) may be carried out after starting the step (A), as described above, and is preferably after the completion of the step (A), and more preferably after the completion of the step (A) and the step (C). In addition, in the method iii), when the step (A) and the step (C) are carried out concurrently, it is preferable that the reaction is carried out by adding dropwise a mixture containing addition polymerization resin monomers to a mixture containing condensation polymerization resin monomers. By this method of allowing two independent reactions to proceed concurrently in a reactor, a hybrid resin in which two resin components are effectively mixed and dispersed can be obtained.

The resin binder for toner obtained according to the present invention is a resin in which the amount of remaining monomers is efficiently reduced, in particular, low-boiling point substances having a boiling point of 150° to 250° C., such as styrene and esters of an ethylenic monocarboxylic acid, are efficiently reduced. The styrene content in such resin binder for toner is preferably 60 ppm or less, more preferably 50 ppm or less, and even more preferably 30 ppm or less. Also, the content of the ester of an ethylenic monocarboxylic acid in the resin binder for toner is preferably 150 ppm or less, and more preferably 100 ppm or less.

The resin binder for toner has a softening point of preferably from 70° to 170° C., more preferably from 80° to 150° C., and even more preferably from 80° to 120° C., from the viewpoint of low-temperature fixing ability, fixable temperature range and storage property. Here, the softening point refers to a temperature corresponding to ½ of the height (h) of the S-shaped curve showing the relationship between the downward movement of a plunger and temperature, namely, a temperature at which a half of the resin flows out, when measured by using a flow tester (CAPILLARY PHEOMETER "CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

Also, the resin binder for toner has a glass transition temperature of preferably from 40° to 80° C. Here, the temperature of maximum endothermic peak is determined with a sample using a differential scanning calorimeter (DSC 210, commercially available from Seiko Instruments, Inc.), when the sample is treated by raising its temperature to 200° C., cooling the sample at a cooling rate of 10° C./min. to 0° C., and thereafter heating the sample so as to raise the temperature at a rate of 10° C./min. The temperature of an intersection of the extension of the baseline of not more than the maximum peak temperature and the tangential line showing the maximum slope between the kickoff of the peak and the top of the peak is determined. This temperature is referred to as glass transition temperature.

The toner obtained by mixing the resin binder for toner obtained according to the present invention together with a colorant and the like has highly reduced amount of remaining monomers, so that it is highly safe, and odor emission is suppressed even at high temperatures.

EXAMPLES

The following examples further describe and demonstrate embodiments of the present invention. The examples are given solely for the purposes of illustration and are not to be construed as limitations of the present invention.

[Weight-Average Molecular Weight of Resin]

The molecular weight distribution is determined by gel permeation chromatography by the method as described below, and the weight-average molecular weight is calculated.

(1) Preparation of Sample Solution

A resin is dissolved in tetrahydrofuran to a concentration of 0.5 g/100 ml. Next, the solution is filtered using a fluororesin filter having a pore size of 2 μm (FP-200, commercially available from Sumitomo Electric Industries, Ltd.), to remove insoluble components to give a sample solution.

(2) Determination of Molecular Weight Distribution

The measurement is taken by passing tetrahydrofuran as an eluent at a flow rate of 1 ml per minute, stabilizing a column in a thermostat at 40° C., and injecting 100 μl of the sample solution. The molecular weight of the sample is calculated from a calibration curve previously obtained. Here, the calibration curves used are obtained using several types of monodispersed polystyrenes as a standard sample.

Apparatus for Measurement: CO-8010 (commercially available from Tosoh Corporation)

Column for Analysis: GMHLX+G3000HXL (commercially available from Tosoh Corporation)

Example 1

A 10-liter four-necked flask equipped with a nitrogen inlet tube, a dehydration tube, a stirrer and a thermocouple was charged with 4165 g of polyoxypropylene(2.2)-2,2-bis(4-hydroxyphenyl)propane, 1658 g of polyoxyethylene(2.0)-2,2-bis(4-hydroxyphenyl)propane, 1344 g of terephthalic acid and 868 g of dodecenylsuccinic anhydride as condensation polymerization resin monomers, and 16 g of tin octylate as an esterification catalyst. Further, the condensation polymerization was allowed to proceed at 230° C. until no more granules of terephthalic acid were observed, and further allowed to proceed at 8.3 kPa for 1 hour.

Thereafter, while 828 g of a polyethylene wax "Parafrint H 105" (commercially available from Sazol) was added, the temperature was decreased to 160° C., and a mixture containing 1632 g of styrene, 358 g of 2-ethylhexyl acrylate and 117 g of acrylic acid (dually reactive monomer) as vinyl resin monomers and 80 g of dicumyl peroxide as a polymerization initiator, was added dropwise from a dropping funnel to the stirred ingredients over a period of 1 hour.

After the addition, the addition polymerization reaction was aged for 1 hour, with keeping the temperature at 160° C. Thereafter, the temperature was raised to 210° C., and the reaction mixture was kept at 8 kPa for 0.5 hours. The weight-average molecular weight of the vinyl resin produced at this time was 7400. Thereafter, 500 ml of water was added dropwise over 1 hour under stirring at the same temperature, to give a resin.

Example 2

In Example 1, the same procedures as in Example 1 were carried out, except that at the final stage the reaction mixture was heated to 210° C. and kept at 8 kPa for 1 hour, thereafter 622 g of trimellitic anhydride was added as an additional condensation polymerization resin monomer, and the condensation polymerization was carried out until the desired softening point was attained, to give a resin. Incidentally, the weight-average molecular weight of the vinyl resin produced before the addition of water was 7700.

Example 3

In Example 1, the same procedures as in Example 1 were carried out, except that a polyethylene wax was not used, to give a resin. Incidentally, the weight-average molecular weight of the vinyl resin produced before the addition of water was 8200.

Example 4

A 5-liter four-necked flask equipped with a nitrogen inlet tube, a dehydration tube, a stirrer and a thermocouple was charged with 1470 g of polyoxypropylene(2.2)-2,2-bis(4-hydroxyphenyl)propane, 3186 g of polyoxyethylene(2.0)-2,2-bis(4-hydroxyphenyl)propane, 1906 g of terephthalic acid and 200 g of stearic acid as condensation polymerization resin monomers. While these monomers were stirred under a nitrogen atmosphere at 160° C., a mixture containing 2210 g of styrene, 420 g of 2-ethylhexyl acrylate and 106 g of acrylic acid (dually reactive monomer) as vinyl resin monomers, and 106 g of dicumyl peroxide as a polymerization initiator, was added dropwise from a dropping funnel to the stirred ingredients over a period of 1 hour.

After the addition, the addition polymerization reaction was aged for 1 hour, with keeping the temperature at 160° C. Thereafter, the temperature was raised to 210° C., and the reaction mixture was kept at 8 kPa for 0.5 hours. The weight-average molecular weight of the vinyl resin produced at this time was 2300. Thereafter, 500 ml of water was added dropwise over 1 hour under stirring at the same temperature.

Thereafter, 16 g of tin octylate was added as an esterification catalyst. The temperature was raised to 230° C., and the condensation polymerization was carried out until no more granules of terephthalic acid were observed, to give a resin.

Example 5

The amount 660 g of xylene was placed in a 5-liter glass flask equipped with a reflux condenser, an agitating blade and a funnel for adding momoners dropwise, and heated to 135° C. under a nitrogen stream. Next, 2464 g of styrene and 336 g of 2-ethylhexyl acrylate as vinyl resin monomers, and 112 g of dicumyl peroxide and 84 g of lauryl mercaptan as a polymerization initiator, were added dropwise over a period of 2 hours under stirring at 135° C. from a dropping funnel to the xylene. The reaction was allowed to proceed at the same temperature for another 2 hours, and then at 170° C. for 1 hour, to complete the addition polymerization. Thereafter, xylene was removed under the conditions at 200° C. at reduced pressure of 8 kPa for 2 hours. The weight-average molecular weight of the vinyl resin produced at this time was 10500. Thereafter, 250 ml of water was added dropwise over 1 hour at the same temperature, to give a resin.

Example 6

The same procedures as in Example 1 were carried out, except that the reaction mixture was kept at 8 kPa for 0.5 hour after adding water dropwise, to give a resin. Incidentally, the weight-average molecular weight of the vinyl resin produced before the addition of water was 8800.

Example 7

The same procedures as in Example 1 were carried out, except that 200 ml of water was added dropwise over 0.5 hours instead of adding 500 ml of water dropwise over 1 hour, to give a resin. Incidentally, the weight-average molecular weight of the vinyl resin produced before the addition of water was 8200.

Example 8

The same procedures up to the step of adding dropwise the mixture containing vinyl resin monomers and polymerization initiator over 1 hour as in Example 1 were carried out.

After the addition, the addition polymerization reaction was aged for 0.5 hours, with keeping the temperature at 160° C. Thereafter, 55 g of fumaric acid was added, and the reaction mixture was further aged for 1 hour. Subsequently, the temperature was raised to 210° C., and the reaction mixture was further kept at 8 kPa for 0.5 hours. The weight-average molecular weight of the vinyl resin produced at this time was 8000. Thereafter, 500 ml of water was added dropwise over 1 hour under stirring at the same temperature. After the addition, the reaction mixture was kept at 8 kPa for 1.5 hours, to give a resin.

Comparative Example 1

The same procedures as in Example 1 were carried out, except that water was not added at the final stage, to give a resin.

Comparative Example 2

The same procedures up to the step of adding dropwise the mixture containing vinyl resin monomers and polymerization initiator over 1 hour as in Example 1 were carried out.

After the addition, the addition polymerization reaction was aged for 0.5 hour, with keeping the temperature at 160° C. Thereafter, the temperature was raised to 210° C. The experimental setup was modified so as to allow for bubbling by blowing of nitrogen in the melts, and the reaction mixture was kept at 8 kPa for 1 hours with bubbling by blowing of nitrogen, to give a resin.

Comparative Example 3

The same procedures up to the step of adding dropwise the mixture containing vinyl resin monomers and polymerization initiator over 1 hour as in Example 1 were carried out.

After the addition, 20 g of dicumyl peroxide as a polymerization initiator was further added dropwise over 1 hour. The addition polymerization reaction was aged for 1 hour, with keeping the temperature at 160° C. Thereafter, the temperature was raised to 210° C., and the reaction mixture was kept at 8 kPa for 1 hour, to give a resin.

Comparative Example 4

The same procedures up to the step of adding dropwise the mixture containing vinyl resin monomers and polymerization initiator over 1 hour as in Example 1 were carried out, except that 20 g of p-menthanehydroperoxide was further added as a polymerization initiator to the mixture containing vinyl resin monomers and polymerization initiator.

After the addition, the addition polymerization reaction was aged for 2 hours, with keeping the temperature at 160° C. Thereafter, the temperature was raised to 210° C., and the reaction mixture was kept at 8 kPa for 1 hour, to give a resin.

Each of the resins obtained in Examples and Comparative Examples was cooled and pulverized. Thereafter, the contents of the remaining styrene and ester of an ethylenic monocarboxylic acid (2-ethylhexyl acrylate) were determined. The results are shown in Table 1.

The contents of styrene and 2-ethylhexyl acrylate were determined by the following method using gas chromatography (GC).

1. Determination Conditions for Gas Chromatography (GC)

[Instrument for Determination]
Apparatus for Determination: GC-14 A (commercially available from Shimadzu Corporation)
Detector: Flame Ionization Detector (FID)
Column: Internal Diameter: 32 mm×Length: 2.1 m
Packing Material: PEG-20 M (10%), Chromosorb W60/80 AW-DMCS

[Determination Conditions]
Temperature-raising Program:
INITIAL TEMP: 100° C.
INITIAL TIME: 10 min
PROGRAM RATE: 10° C./min
FINAL TEMP: 200° C.
FINAL TIME: 10 min
Inlet Temperature: 250° C.
Detector Temperature: 250° C.
RANGE: $10^2$
Solvent: Ethyl Acetate and Hexane 2. Preparation of Calibration Curve (Internal Standard Method)

The amount 0.1 g of ethyl benzene, styrene and 2-ethylhexyl acrylate are each precisely weighed, and then messed up with ethyl acetate, to prepare a 50-ppm standard solution. From the determination results of the standard solution, the concentration ratio and peak area ratio of each of styrene and 2-ethylhexyl acrylate to ethyl benzene are determined and calibration curves are obtained.

3. Preparation of Internal Standard Solution

The amount 0.1 g of ethyl benzene is precisely weighed, and then messed up with ethyl acetate, to prepare a 50-ppm standard solution.

4. Quantification of Styrene

The amount 0.5 g of a sample is precisely weighed in a 20-ml screw tube, and then 2 ml of a standard solution (solution prepared by dissolving ethyl benzene in ethyl acetate) is added thereto. Further, 8 ml of ethyl acetate is added, dissolve the sample in a ball mill for 20 minutes.

Next, about 3 ml of hexane is added, and thereafter the resulting mixture is filtered through a filter having a sieve opening of 0.2 µm. The amount 0.2 µl of the resulting filtrate is poured into the apparatus from the inlet.

From the determination results, the concentration ratio and peak area ratio of each of styrene and 2-ethylhexyl acrylate to ethyl benzene are determined, and the styrene content is calculated using the calibration curve.

Test Example

The amount 5 g of each of the resins obtained in Examples and Comparative Examples was heated on a hot plate at 200° C. for 5 minutes. Odor from the resin after heating was evaluated by 10 persons, and scored from 1 to 4 in accordance with the following criteria. The average values from the scoring are shown in Table 1.

[Score]
1: Strong odor emitting
2: Odor emitting
3: Substantially no odor
4: No odor

TABLE 1

| | Styrene Content (ppm) | 2-Ethylhexyl Acrylate Content (ppm) | Odor Evaluation |
|---|---|---|---|
| Example 1 | 45 | 86 | 3.7 |
| Example 2 | 53 | 141 | 3.7 |
| Example 3 | 41 | 96 | 3.6 |
| Example 4 | 67 | 131 | 3.5 |
| Example 5 | 35 | 107 | 3.7 |
| Example 6 | 48 | 99 | 3.7 |
| Example 7 | 64 | 121 | 3.3 |
| Example 8 | 8 | 85 | 3.7 |
| Comp. Example 1 | 147 | 238 | 1.4 |
| Comp. Example 2 | 128 | 299 | 1.7 |
| Comp. Example 3 | 110 | 203 | 1.3 |
| Comp. Example 4 | 125 | 254 | 1.3 |

It can be seen from the above results that the resins obtained in Examples 1 to 8 have a reduced amount of remaining monomers and substantially no odor at a high temperature, as compared with the resins obtained in Comparative Examples 1 to 4.

The toner containing as a resin binder a resin obtained in any of Examples 1 to 8 has an extremely reduced amount of remaining monomers, with suppressed odor emitting, so that the toner can be suitably used in an electrophotographic machine.

The resin binder for a toner obtained according to the present invention can be used, for example, for developing electrostatic latent images formed in electrophotography, electrostatic recording method, electrostatic printing method, and the like, and a toner containing the resin binder.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a resin binder for toner, comprising the steps of:

(A) carrying out an addition polymerization reaction of addition polymerization resin monomers including styrene in the presence or absence of an organic solvent; and (B) mixing the resulting reaction mixture from the step (A) with water at a rate of 0.002 to 0.5 parts by weight based on 100 parts by weight of the addition polymerization resin monomers per minute at a temperature of 100° to 300° C. during and/or after the step (A), wherein the amount of water to be mixed in the step (B) is 0.1 to 50 parts by weight based on 100 parts by weight of the addition polymerization resin monomers.

2. The process according to claim 1, wherein styrene comprises 30 to 95% by weight of the addition polymerization resin monomers.

3. The process according to claim 1, wherein the addition polymerization resin monomers further comprise an ester of an ethylenic monocarboxylic acid which is copolymerizable with styrene.

4. The process according to claim 1, wherein the addition polymerization reaction in the step (A) is carried out in the presence of a wax.

5. A process for preparing a resin binder for toner, comprising the steps of:

(A) carrying out an addition polymerization reaction of addition polymerization resin monomers including styrene in the presence or absence of an organic solvent;

(B) mixing the resulting reaction mixture from the step (A) with water at a temperature of 100° to 300° C. during and/or after the step (A); and (C) introducing condensation polymerization resin monomers into the reaction system in the step (A) in at least one timing selected from before, during and after the step (A), to carry out a condensation polymerization reaction, wherein the amount of water to be mixed in the step (B) is 0.1 to 50 parts by weight based on 100 parts by weight of the addition polymerization resin monomers.

6. The process according to claim 5, wherein styrene comprises 30 to 95% by weight of the addition polymerization resin monomers.

7. The process according to claim 5, wherein the addition polymerization resin monomers further comprise an ester of an ethylenic monocarboxylic acid which is copolymerizable with styrene.

8. The process according to claim 5, wherein the addition polymerization reaction in the step (A) is carried out in the presence of a wax.

9. The process according to claim 5, wherein the condensation polymerization resin monomers are raw material monomers for a polyester.

10. The process according to claim 9, wherein the raw material monomers for a polyester comprise a compound represented by the formula (I):

(I)

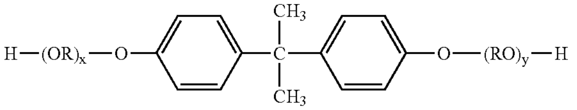

wherein R is an alkylene group having 2 or 3 carbon atoms; x and y are a positive number; and the sum of x and y is from 1 to 16.

11. The process according to claim 5, wherein the condensation polymerization reaction and the addition polymerization reaction are carried out in the presence of a monomer capable of reacting with both of the condensation polymerization resin monomers and the addition polymerization resin monomers.

12. A resin binder for toner obtained by the process as defined in claim 7, wherein the styrene content is 60 ppm or less, and the content of the ester of the ethylenic monocarboxylic acid is 150 ppm or less.

13. A resin binder for toner obtained by the process as defined in claim 5, wherein the styrene content is 60 ppm or less.

14. A resin binder for toner obtained by the process as defined in claim 7, wherein the content of the ester of the ethylenic monocarboxylic acid is 150 ppm or less.

* * * * *